(12) United States Patent
Zhang et al.

(10) Patent No.: US 12,430,317 B2
(45) Date of Patent: Sep. 30, 2025

(54) VERIFICATION OF BACKUP DATA ACROSS A DATA PIPELINE

(71) Applicant: Salesforce, Inc., San Francisco, CA (US)

(72) Inventors: Lionel Zhang, Bellevue, WA (US); Zachary Taylor, Lowell, AR (US)

(73) Assignee: Salesforce, Inc., San Francisco, CA (US)

( * ) Notice: Subject to any disclaimer, the term of this patent is extended or adjusted under 35 U.S.C. 154(b) by 65 days.

(21) Appl. No.: 18/426,634

(22) Filed: Jan. 30, 2024

(65) Prior Publication Data

US 2025/0245211 A1 Jul. 31, 2025

(51) Int. Cl.
G06F 16/20 (2019.01)
G06F 11/14 (2006.01)
G06F 16/23 (2019.01)

(52) U.S. Cl.
CPC ...... *G06F 16/2365* (2019.01); *G06F 11/1458* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2011/0283085 A1* | 11/2011 | Dilger | ............... | G06F 11/1004 711/216 |
| 2016/0077926 A1* | 3/2016 | Mutalik | ............ | G06F 16/1844 711/162 |
| 2016/0292250 A1* | 10/2016 | Chen | ................ | G06F 16/273 |
| 2021/0397600 A1* | 12/2021 | Desai | ................ | H04L 9/0643 |
| 2022/0109557 A1* | 4/2022 | Venkatesh | ............ | H04L 9/50 |
| 2023/0412391 A1* | 12/2023 | Soeldner | ............ | G16H 10/40 |

* cited by examiner

*Primary Examiner* — Belix M Ortiz Ditren
(74) *Attorney, Agent, or Firm* — Butzel Long

(57) ABSTRACT

Systems, devices, and techniques are disclosed for verification of backup data across a data pipeline. Records from a first storage may be received at a first end of a data pipeline. The records may be hashed to generate first hashes. A first hash tree may be generated from the first hashes. The records may be received at a second end of the data pipeline. Bits of bitmaps that correspond to the records may be set. The records may be hashed to generate second hashes. The records may be stored in a second storage. A second hash tree may be generated form the second hashes. Using the bitmaps, whether all of the records or any duplicate records were received may be determined. The first hash tree and the second hash tree may be compared to determine if any of the records stored in the second storage are corrupt.

20 Claims, 6 Drawing Sheets

VERIFICATION OF BACKUP DATA ACROSS A DATA PIPELINE

BACKGROUND

The data integrity of customer data that is being backed up needs to be ensured. Each object, field, and value in the backup data should be identical to the original customer data that is being backed up. During backup, the customer data may go through multiple stages of a data pipeline from the source of the data to the destination where the backup data will be stored. The data may be transformed in different ways during its transit of the data pipeline. Any mishandling, misconfiguration, or bugs at any point in the data pipeline can result in data corruption and could cause the backup date to be unusable. The backup data may be verified in order to ensure that it is uncorrupted. This may be done by compared the backup data to the original customer data object by object, field by field, and value by value. Doing this is logically inefficient and time consuming.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
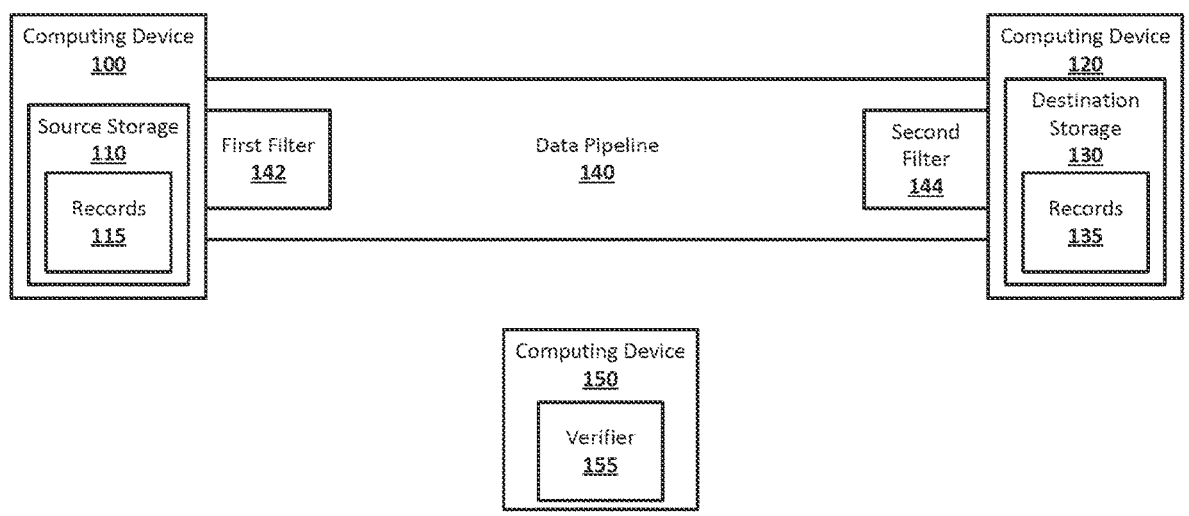
FIG. 1 shows an example system suitable for verification of backup data across a data pipeline according to an implementation of the disclosed subject matter.

Techniques disclosed herein enable verification of backup data across a data pipeline, which may allow data backed up across a data pipeline to be verified efficiently before being made available for use. Records may be received at a first end of a data pipeline from a storage. The records may be hashed to generate hashes. A hash tree may be generated from the hashes. The records may be received at a second end of the data pipeline. Bitmaps may be generated for unique batches of the records. Bits of the bitmaps that correspond to the records received at the second end of the data pipeline may be set as the records are received at the second end of the data pipeline. The records may be hashed as they are received at the second end of the data pipeline to generate new hashes. The records may be stored in a second storage as they are received at the second end of the data pipeline. A new hash tree may be generated from the new hashes. The bitmaps may be used to determine if all of the records were received at the second end of the data pipeline and if any duplicates of any of the records were received at the second end of the data pipeline. The hash tree and the new hash tree may be compared to determine if any of the records stored in the second storage are corrupt. Access to the records in the second storage may be prevented until the comparison of the first hash tree and the second hash tree determines that none of the records in the second storage are corrupt.

Records may be received at a first end of a data pipeline from a storage. The records received at the first end of the data pipeline may be copies of records stored in the storage. The records stored in the storage may be records that include any suitable data in any suitable format. For example, the records stored in the storage may be part of a database. The records may be stored in a first, or source, storage that may include suitable physical storage devices using any suitable forms of memory. The records may be backed up by being copied to a second, or destination, storage from the source storage, backing up the data in the records. The source storage may be logically near the first end of a data pipeline between the source storage and the destination storage. The data pipeline may include various systems and processes that may perform operation on data, such as records, and move that data from the source storage to the destination storage. To begin backing up the records, records that are copies of the records from the source storage may first be received at first filter located near the first end of the data pipeline. The records in the source storage may remain stored in the source storage and may not be modified as part of backing up the records. The first filter may be located in the data pipeline as close as possible to the source storage to ensure that the records received at the hasher have undergone minimal processing and transfer before reaching the first filter. This may reduce the possibility of corruption of the copies of the records before they reach the first filter.

The first filter may assign ordinal identifiers and batch identifiers to received records. The first filter may assigned the same batch identifier a number of records B received sequentially at the first filter before assigning a different batch identifier to the next B records that are received, where B may be the branching factor of the hash tree that will be built from the hashes of the records. For example, with a B of 4, the first four records received by the first filter may be assigned a first batch identifier, the second four records received by the first filter may be assigned a second batch identifier, the third four records received by the first filter may be assigned a third identifier, and so on for all records received by the first filter. Records assigned the same batch identifier may be in the same batch. The ordinal identifier may be any suitable identifier that may be assigned to records and may be unique to each record in the same batch but may be, though does not have to be, repeated across batches. For example, four records in a first batch may have respective ordinal identifiers of 1, 2, 3, and 4, and four records in a second batch may have the same ordinal identifiers of 1, 2, 3, and 4. The batch identifier and ordinal identifier for a record may be stored in the record though augmentation of the record, for example, adding any suitable number of fields to the record to store the batch identifier and ordinal identifier. Any augmentation of the records performed by any part of the data pipeline, such as the adding of fields, may be removed before the records are stored in the destination storage.

In some implementations, instead of assigning ordinal identifiers and batch identifiers to the records, object identifiers that may already be stored in the records may be used to assign the records to batches. The object identifier may be, for example, an identifier that is unique to each record and that was assigned to the records in the source storage by the database system that generated the records. The first filter may add an additional record to each batch of records that may indicate a batch identifier for the batch and the starting object identifier and ending object identifier for the batch based on the object identifiers of the records in the batch. The first filter may need to assign records to batches such that the object identifiers of the records are sequential both within batches and across all batches eliminating the need to use explicit batch and ordinal identifiers.

The records may be hashed to generate hashes. The first filter may generate hashes for individual records as they are received. The first filter may hash a record after, if necessary, assigning the record a batch identifier and ordinal identifier. The first filter may hash a record by first concatenating any ordinal identifier to the record, then hashing the result of the concatenation with any suitable hashing algorithm, such as, for example, SHA-256. If the records have object identifiers instead of ordinal identifiers, the object identifier for the record may be added to the hash of the record.

A hash tree may be generated from the hashes. The hash tree may be generated by the first filter using the hashes generated from the records and may be a source hash tree for the copying of the records from the source storage to the destination storage. The hash tree may have a branching factor of B, which may be the same as the number of records in a batch. The first filter may generate the hash tree as records are received and hashed. At the lowest level of the hash tree, the first filter may generate each leaf to include a hash value of single record. At the second lowest level of the hash tree, the first filter may generate each node to include a combination hash generated from all of the hashes from a single batch, such that, for example, the first node at the second lowest level may include a combination hash generated from all B hashes of records assigned to the first batch, the second node may include a combination hash generated from all B hashes of records assigned to the second batch, and so on until all of the records received at the first filter, hashed and added to hash tree as leaves have been used to generate a combination hash for a node at the second lowest level. The final node at the second lowest level may have fewer than B hashes if, for example, the total number of records received at the first filter is not evenly divisible by B. The combined hash for a batch may be generated in any suitable manner, such as, for example, using a commutative operator such as xor between all of the hashes in a batch. For a record, recx, let $Hx=hash(ord(recx)\|recx)$, where $ord()$ is the ordinal of the record and $hash()$ is hashing algorithm such as SHA-256. The combined hash of the batch that includes three records, rec1, rec2 and rec2, may be calculated as $combined\_hash(rec1, rec2, rec3)=H1$ xor $H2$ xor $H3$. In some implementations that use a hashing algorithm $hash()$ that may be collision-prone, such as MurmurHash3, the combined hash for a batch may be calculated as $combined\_hash(rec1, rec2, rec3)=H'$ xor $H1$ xor $H2$ xor $H3$ where $H'=hash'(batch-header)$, where $hash'$ is a hashing algorithm that is less collision prone, such as SHA-256. The first filter may generate a node at the third lowest level of the hash tree by generating a combined hash from the combined hashes of B leaves, such that, for example, the first node at the third lowest level may include a combined hash generated by combining the combined hashes of the first B nodes of the second lowest level, the second node at the third lowest level may include a combined hash generated by combining the combined hashes of the next B nodes of the second lowest level, and so on until all combined hashes from the nodes at the second lowest level have been used to generate a combined hash for a node at the third lowest level of the hash tree. Like the last node of the second lowest level, the last node of the third lowest level may include a combination hash generated from fewer than B nodes of the second lowest level. The first filter may then generate the next level up of the hash tree in a similar manner, with each node including a combined hash generated by combining the combined hashes of B nodes from the third lowest level of the hash tree. The first filter may generate the hash tree in this manner until the root of the hash tree is generated from a level that has B nodes or fewer. At the lowest level, the hash tree may also include the batch identifier and ordinal identifier, or object identifier, associated with the hashes in the leaves, so that record the hash was generated from may be identified.

The records may be received at a second end of the data pipeline. The records, after being hashed by the first filter and having, if necessary, ordinal identifiers and batch identifiers added, may be transferred across the data pipeline to a second filter located near the destination storage. The data pipeline may involve the records being transmitted in any suitable manner over any suitable data buses and networks and being processed by any suitable running processes on any systems that are part of the data pipeline. The records may arrive at the second filter in any order and may not always be received at the second filter in the same order in which they were received at the first filter.

Bitmaps may be generated for unique batches of the records. The second filter may, for example, generate a separate bitmap for each unique batch of records received at the second filter. A bitmap may include storage for a number of bits equal to B, which may be the maximum number of records in each batch. Each bit may correspond to specific ordinal identifier that was assigned to the records or may correspond to the position of an object identifier within the sequence of object identifiers in a batch. For example, if ordinal identifiers 1, 2, 3, and 4 are used for batches with four records, a bitmap may store 4 bits that may correspond, respectively, to the ordinal identifiers 1, 2, 3, and 4. If object identifiers are used for batches with four records, a bitmap may store 4 bits that may correspond to the lowest, second lowest, third lowest, and highest object identifiers, respectively. The second filter may not generate a bitmap for the last batch of records as this batch may have fewer than B records. Instead, the first filter may generate the bitmap for the last batch of records and send this bitmap to the second filter as an indication of the end of the batches. The second filter may generate the bitmaps as needed based on how many unique batches the second filter has received some but not all records from. For example, if for all batches, the records in a batch arrive at the second filter without being interrupted by a record from another batch, the second filter may only need to generate and use one bitmap that may be reused for each batch.

Bits of the bitmaps that correspond to the records received at the second end of the data pipeline may be set as the records are received at the second end of the data pipeline. The second filter may, for example, check the ordinal identifier and batch identifier of a received record, and then may set a bit corresponding to the ordinal identifier of the record in a bitmap for the batch that the record belongs to. If the records use object identifiers, the second filter may use the additional record added to each batch by the first filter to determine which batch a received record belongs to and where in the batch the record is positioned in order to set the appropriate bit of the correct bitmap for a received record.

The bitmaps may be used to determine if all of the records were received at the second end of the data pipeline and if any duplicates of any of the records were received at the second end of the data pipeline. The second filter may use the bitmaps to determine whether all the records that are to be stored in the destination storage have been received and whether any duplicate records have been received. For example, if there is a bitmap that does not have all of its bits flipped, this may indicate that the records that correspond to those bits have not yet been received. The second filter may then send a request, for example, to the first filter, that the missing records be resent, for example. If a bit in a bitmap is flipped, and the second filter receives a record that it determines should flip the already flipped bit, this may indicate a duplicate record has been received. The second filter may discard the duplicate record.

The records may be hashed as they are received at the second end of the data pipeline to generate new hashes. The records may be hashed by the second filter in the same manner and using the same algorithm as the hashing at the first filter. The records may be hashed as they arrive at the second filter.

The records may be stored in a second storage as they are received at the second end of the data pipeline. The records may be stored in the second storage, or destination storage, at the second end of the data pipeline in conjunction with being hashed at the second filter. Any augmentation of the records, for example, the addition of ordinal identifiers and batch identifiers, may be reverted before the records are stored in the destination storage. The destination storage may include any suitable physical storage devices that may separate from those of the source storage. The destination storage may be located any suitable physical distance from the source storage. For example, the source storage and destination storage may be located nearby each other, such as in the same building or data center, or may be geographically disparate, for example, located in different data centers. The records stored in the destination storage may be a backup copy of the records copied from the source storage and sent to the first filter.

A new hash tree may be generated from the new hashes. The second filter may generate a hash tree, which may be a destination hash tree, from the hashes generated by the second filter. The records may be received at the second filter in a different order than they were received at the first filter so the second filter may not generate the destination hash tree based on the order in which the records are received at the second filter. Instead, the second filter may use the batch identifiers and ordinal identifiers, or object identifiers and additional record, to establish the order in which the received records, and their hashes, will be used to generate the destination hash tree. For example, to generate the combined hash for the first leaf of the destination hash tree, the second filter may wait until it has received all of the records that are identified as belonging to the first batch before combining the hashes of those records. This may result in the first leaf of the destination hash tree being generated with hashes of the same B records whose hashes were used to generate the first leaf of the source hash tree, even if those records are not the first B records received at the second filter. The batch identifiers and ordinal identifiers, or object identifiers, may allow the second filter to replicate the order in which the records were received at the first filter regardless of the order in which the records are received at the second filter. At the lowest level, the hash tree may also include the batch identifier and ordinal identifier, or object identifier, associated with the hashes in the leaves, so that record the hash was generated from may be identified. The second filter may thus be able to generate the destination hash tree in the same manner that the first filter generated the source hash tree.

The hash tree and the new hash tree may be compared to determine if any of the records stored in the second storage are corrupt. The source hash tree and the destination hash tree may be compared outside of the data pipeline, for example, at a verifier. The verifier may receive the source hash tree from the first filter or may receive the hashes generated by the first filter and then rebuild the source hash tree. The verifier may receive the destination hash tree from the second filter and may perform a root-down comparison of the source hash tree and destination hash tree If the combined hashes in the root nodes of the source hash tree and destination hash tree are equal, no records may have been corrupted in the data pipeline, the records stored in the destination storage may be considered verified, and the comparison may end. If the combined hashes in the root nodes of the source hash tree and destination hash tree are not equal, records may have been corrupted in the data pipeline, the records stored in the destination storage may be considered corrupted, and the comparison may continue to identify the corrupt records. To identify the corrupt records, the verifier may compare the combined hash in each child node of the root node of the destination hash tree with the combined hash in its counterpart node in the source hash tree to determine if they are equal. Any child node of the root node of the destination hash tree that has a combined hash that is not equal to the combined hash of its counterpart node in the source hash tree may then have the same comparison performed with its own child nodes. The comparison may thus proceed down the destination hash tree only though nodes that have combination hashes that are not equal to the combination hashes of their counterpart nodes in the source hash tree until reaching the second lowest level of the destination hash tree. At the second lowest level of the destination hash tree, any node with a combination hash that is not equal to the combination hash of its counterpart node in the source hash tree may represent a batch with a corrupted record. To determine which records in a batch with a corrupted record are corrupt, the records in the batch may be scanned at the lowest level of the hash tree. For example, the verifier may compare hashes for the records in the batch generated by the first filter with the hashes for the records generated by the second filter to determine which are not equal. If the hash generated by the second filter for a record is not equal to the hash generated by the first filter for that record, the record was corrupted after leaving the first filter and before being hashed by the second filter. The verifier may then notify any suitable component of the data pipeline, such as the first filter or the second filter, of the identities of the corrupted records, for example, by batch identifier and ordinal identifier or by object identifier. The records identified as being corrupted may be resent to the second filter which may rehash them, rebuild the destination hash tree, and send the rebuilt destination hash tree to the verifier for comparison to the source hash tree to determine if there is any further corruption, allowing the resending and reverifying of only individual batches rather than the entire data set. Using hash trees to verify the records may be more efficient than attempting a record by record comparison or by comparing all the individual record hashes while still allowing the corrupt records to be identified.

Access to the records in the second storage may be prevented until the comparison of the first hash tree and the second hash tree determines that none of the records in the second storage are corrupt. The records may be stored in the destination storage before being verified through comparison of the source hash tree and destination hash tree. Any access to the records, for example, to be used in a data restoration process at the source storage, may be prevented until the records have been verified as not corrupt. This may prevent restoration of corrupted records and ensure that the corrupted records are not accessed for any purpose other than deletion. The records in the second storage may only be made accessible and usable, for example, to a customer whose records from the source storage were backed up as the records in the destination storage, when the verifier has determined that none of the records are corrupt.

FIG. 1 shows an example system suitable for verification of backup data across a data pipeline according to an implementation of the disclosed subject matter. A computing device 100 may be, for example, the computer 20 as described in FIG. 6, or components thereof. The computing device 100 may include any number computing devices, each of which may include any suitable combination of central processing units (CPUs), graphical processing units (GPUs), and tensor processing units (TPUs). The computing device 100 may be distributed over any geographic area, and may, for example, include geographically disparate computing devices connected through any suitable network connections. The computing device 100 may be, or be a part of, a cloud computing server system that may support multi-tenancy.

The computing device 100 may include source storage 110. The source storage 110 may be any suitable combination of hardware and software for storing data on any suitable physical storage mediums. Source storage 110 may store records 115. The records 115 may be database records. The records 115 may be data for a single database or for multiple databases, and may all belong to the same party, for example, a tenant of a cloud computing server system of which the computing device 100 is a part. The records 115 may be used for any suitable purpose, for example, being part of a live database or being archival records.

Figure 6:
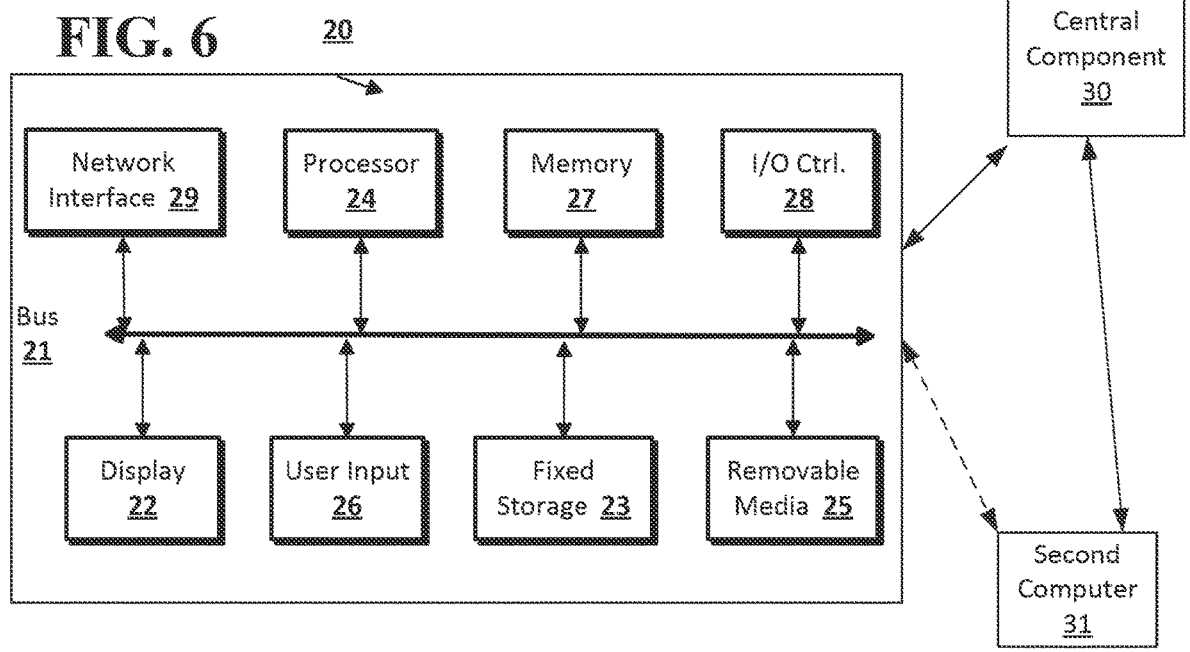
FIG. 6 shows a computer according to an implementation of the disclosed subject matter.

A computing device 120 may be, for example, the computer 20 as described in FIG. 6, or components thereof. The computing device 120 may include any number computing devices, each of which may include any suitable combination of central processing units (CPUs), graphical processing units (GPUs), and tensor processing units (TPUs). The computing device 120 may be distributed over any geographic area, and may, for example, include geographically disparate computing devices connected through any suitable network connections. The computing device 120 may be, or be a part of, a cloud computing server system that may support multi-tenancy.

The computing device 120 may include destination storage 130. The destination storage 130 may be any suitable combination of hardware and software for storing data on any suitable physical storage mediums. The destination storage 130 may store records 135. The records 135 may be database records that are copies of the records 115 after records that are copies of the records 115 have been transferred through a data pipeline 140. The records 135 may be backups of the records 115 and may be used to restore the records 115 if the records 115 are lost, corrupted, or otherwise need to be restored. The destination storage 130 may be separate from the source storage 110 and may, along with the computing device 120, be located at any suitable physical distance from the computing device 100. For example, the computing device 100 and the computing device 120 may be located within the same data center, for example, in the same physical building, or may be separated by any suitable physical distance, for example, in data centers in different geographic locations.

The data pipeline 140 may be any suitable combination of hardware and software that may be used for data transfer between the computing device 100 and the computing device 120. The data pipeline 140 may include, for example, running processes on computing devices that may process data transiting through the computing devices in any suitable manner, along with hardware and software for network communications. The data pipeline 140 may include a first filter 142 and a second filter 144. The first filter 142 may be any suitable combination of hardware and software for processing records received from the computing device 100, for example, augmenting the records, hashing the records and building a hash tree from the records. The first filter 142 may be located as close as possible to the computing device 100 on a first end of the data pipeline 140, such that any data sent to through the data pipeline 140 from the computing device 100 reaches the first filter 142 with minimal interaction with the rest of the data pipeline 140. The second filter 144 may be any suitable combination of hardware and software for processing records received through the data pipeline 140 and originating at the computing device 100, for example, de-augmenting the records, hashing the records and building a hash tree from the records A computing device 150 may be, for example, the computer 20 as described in FIG. 6, or components thereof. The computing device 150 may include any number computing devices, each of which may include any suitable combination of central processing units (CPUs), graphical processing units (GPUs), and tensor processing units (TPUs). The computing device 150 may be distributed over any geographic area, and may, for example, include geographically disparate computing devices connected through any suitable network connections. The computing device 150 may be, or be a part of, a cloud computing server system that may support multi-tenancy.

The computing device 150 may include a verifier 155. The verifier 155 may be any suitable combination of hardware and software for verifying records by comparing hash trees generated from hashes of the records. The verifier 155 may also be able to rebuild a hash tree from provided hashes. The computing device 150 and the verifier 155 may sit outside of the data pipeline 140.

Figure 2:
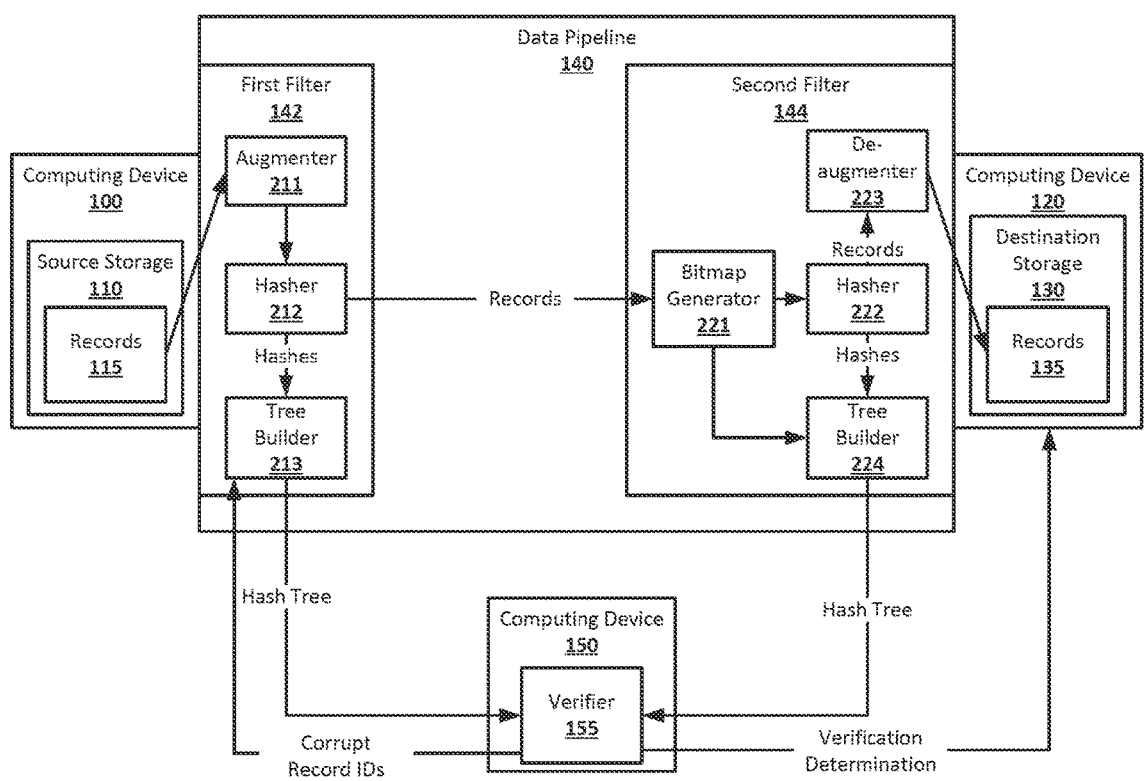
FIG. 2 shows an example arrangement suitable for verification of backup data across a data pipeline according to an implementation of the disclosed subject matter.

FIG. 2 shows an example arrangement suitable for verification of backup data across a data pipeline according to an implementation of the disclosed subject matter. The records 115 may need to be copied from the source storage 110 to the destination storage 130. For example, the records 115 may be database records for a tenant of a cloud computing server system that includes the computing device 100, and may need to be copied to ensure that there is a backup of the records 115 in case any of the records 115 are lost, corrupted, or otherwise rendered unusable. Records that are copies of the records 115 may be transferred to the computing device 120, and the destination storage 130, through the data pipeline 140.

At the first end, or beginning, of the data pipeline 140, the records that are copies of the records 115 may be received at the first filter 142. The first filter 142 may be located as logically close to the computing device 100 as possible, such that records are processed through as little of the data pipeline 140 as possible before being received at the first filter 142.

The first filter 142 may include an augmenter 211. The augmenter 211 may be any suitable combination of hardware and software that may receive the records that are copies of the records 115 and augment them, for example, adding batch identifiers and ordinal identifiers to individual records or adding additional records that include batch identifiers and beginning and ending object identifiers for batches to batches of records. Batch identifiers and ordinal identifiers may, for example, be assigned the records in the order in which the records are received at the augmenter 211.

The first filter 142 may include a hasher 212. The hasher 211 may be any suitable combination of hardware and software that may hash the records that are copies of the records 115 to generate hashes. The hasher 212 may use any suitable hashing algorithm, such as, for example, SHA-256 or MurmurHash3. The hasher 212 may receive the records that are copies of the records 115 after they have been augmented by the augmenter 211. Once records have been augmented by the augmenter 211 and hashed by the hasher 212, they may be sent into the rest of the data pipeline 140 to be received at the second filter 144.

The first filter 142 may include tree builder 213. The tree builder 213 may be any suitable combination of hardware and software that may build a hash tree from the hashes generated by the hasher 212. The tree builder 213 may, for example, receive the hashes generated by the hasher 212 and build a source hash tree with the hashes at the lowest level as leaves, and nodes at each successive level including combined hashes generated either from combining the hashes of the leaves that represent a batch of records or from other combined hashes from nodes the at the level below. The source hash tree built by the tree builder 213 may be sent to the verifier 155 on the computing device 100. In some implementations, the tree builder 213 may be a component of the verifier 155 instead of the first filter 142.

At the second end, or end, of the data pipeline 140, the records that are copies of the records 115 may be received at the second filter 144 from the first filter 142. The second filter 144 may located as logically close to the computing device 120 as possible, such that records are processed through as much of the data pipeline 140 as possible before being received at the second filter 144. This may increase the chances that any corruption of any records that may occur in the data pipeline 140 occurs after the first filter 142 and before the second filter 144, thus allowing the corruption to be detected through comparison of the source hash tree and destination hash tree.

The second filter 144 may include a bitmap generator 221. The bitmap generator 221 may be any suitable combination of hardware and software for generating and using bitmaps to track the batches of the records that are copies of the records 115 as they are received to ensure that all of the records are received and no duplicate records. The bitmap generator 221 may receive bitmaps for non-full batches from the first filter 142 and set bits corresponding to each record as batches are being received, as well as receiving bitmaps for non-full batches. The bitmap generator 221 may also receive an indication of the total number of batches of records that are being sent through the data pipeline 140 so that it may be able to determine if an entire batch is missing. The bitmap generator 221 may read the batch identifier and ordinal identifier of the received records, or the additional records, in order to determine when to generate a new bitmap and which bits of the bitmap to flip.

The second filter 144 may include a hasher 222. The hasher 222 may be any suitable combination of hardware and software that may hash the records that are copies of the records 115 to generate hashes. The hasher 222 may use any suitable hashing algorithm, such as, for example, SHA-256 or MurmurHash3. The hasher 222 may hash the records in the same manner as the hasher 212, such that the hasher 222 and the hasher 212 may generate identical hashes when hashing identical records. The hasher 222 may hash records as they are received at the second filter 144, even if they are received out of order.

The second filter 144 may include a de-augmenter 222. The de-augmenter 222 may be any suitable combination of hardware and software that may de-augment the records that are copies of the records 115, for example, removing batch identifiers and ordinal identifiers that were added by the augmenter 211 or filtering out additional records with batch identifiers and beginning and ending object identifiers added to batches by the augmenter 211. As records arrive at the second filter 144, after they are hashed by the hasher 222, they may be sent to the de-augmenter 223 to be de-augmented. The de-augmented records may then be processed by any remaining portion of the data pipeline 140 before reaching the computing device 120 and being stored in the destination storage 130 as the records 135. The records 135 may be copies of the records 115. The records may be stored as the records 135 before being verified to be complete and non-corrupt by the verifier 155. The records 135 may not be made available for use, for example, to restore corrupt or missing records from the records 115, until the verifier 155 has verified that none of the records 135 are corrupt or missing such that that the records 135 are identical copies of the records 115.

The second filter 144 may include a tree builder 224. The tree builder 224 may be any suitable combination of hardware and software that may build a hash tree from the hashes generated by the hasher 222. The tree builder 224 may, for example, receive the hashes generated by the hasher 222 and build a destination hash tree with the same form as the source hash tree. Because the records that are copies of the records 115 may be received at the second filter 144 in a different order than they were received at the first filter 142, the tree builder 224 may use the bitmaps from the bitmap generator 221 and batch identifiers and ordinal identifiers, or the additional records with batch identifiers and beginning and ending object identifiers, to reconstruct the order in which the records were received at the first filter 142 and used to build the source hash tree. This may allow the tree builder 224 to build the destination hash tree using hashes of the records 115 generated by the hasher 222 as if the copies of the records 115 arrived at the second filter 144 in the same order they arrived at the first filter 142, regardless of the actual order in which the copies of the records 115 arrive at the second filter 144. The destination hash tree built by the tree builder 224 may be sent to the verifier 155 on the computing device 100. In some implementations, the tree builder 224 may be a component of the verifier 155 instead of the second filter 144.

The verifier 155 may receive the source hash tree from the tree builder 213 and the destination hash tree from the tree builder 224. The verifier 155 may perform a root-down comparison of the source hash tree and the destination hash tree to determine whether or not they are identical, and if they are not identical, which of the records were corrupt when received at the second filter 144. If the verifier 155 determines that the source hash tree and destination hash tree are identical, for example storing identical combined hashes in their root nodes, the verifier 155 may send to the computing device 120 a determination that records stored as the records 135 have been verified. The computing device 120 may make the records 135 available for use, for example, to restore corrupt or missing records from the records 115, or for any other suitable purpose.

If the verifier 155 identifies any corrupt records based on the source hash tree and the destination hash tree not being identical, the verification may send to the computing device 100 a determination that the verification failed and the records 135 are corrupt. The computing device 120 may continue to prevent access to and use of the records 135 for any purposes other than deletion and replacement of records or other administrative tasks that are not harmed by the records 135 including corrupt records. For example, any attempt by the tenant who owns the records 115 to use the records 135, for example, to restore corrupt or missing records from the records 115, may be prevented by the computing device 120. The verifier 155 may identify the corrupt records, for example, by batch identifier and ordinal identifier, to the first filter 142. The first filter 142 may then request that new copies of the identified records be sent from the source storage 110 to the second filter 144. The second filter 144 may then hash the new copies of the records, store de-augmented copies of the new copies of the records 135 in the destination storage 130 replacing the corrupt copies, and the tree builder 224 may rebuild the destination hash tree after replacing the hashes of the corrupt copies of the records with the hashes of the new copies of the records. The verifier 155 may then re-run its comparison to determine if there are still corrupt records stored as the records 135. This may be repeated until the verifier 155 successfully verifies the records 135, finding no corrupt records.

Figure 3:
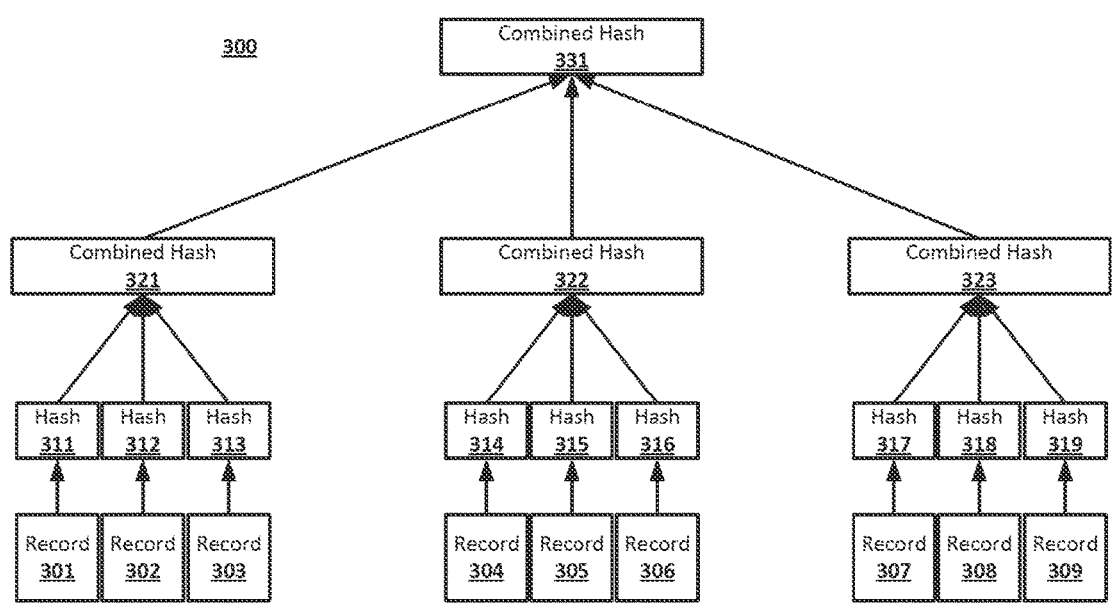
FIG. 3 shows an example arrangement suitable for verification of backup data across a data pipeline according to an implementation of the disclosed subject matter.

FIG. 3 shows an example arrangement suitable for verification of backup data across a data pipeline according to an implementation of the disclosed subject matter. A hash tree 300, which may be, for example, the source hash tree, may be built from hashes of records. For example, the records 301, 302, 303, 304, 405, 306, 307, 308, and 309 may be copies of records from the records 115 and may be hashed, for example by the hasher 212 to generate respective hashes 311, 312, 313, 314, 315, 316, 317, 318, and 319. For a hash tree with a branching factor B of 3, each batch may include three records. For example, a batch with a batch identifier of 1 may include the records 301, 302, and 303, with respective ordinal identifiers of 1, 2, and 3, a batch with a batch identifier of 2 may include the records 304, 305, and 306, with respective ordinal identifiers of 1, 2, and 3, and a batch with a batch identifier of 3 may include the records 307, 308, and 309, with respective ordinal identifiers of 1, 2, and 3. The hashes 311, 312, 313, 314, 315, 316, 317, 318, and 319 may be used as the leaves of the hash tree 300. Each hash from a group of three hashes that corresponds to a batch may be combined, for example, using an xor operation on binary representations of the hashes, to generate a node for the next level up of the hash tree 300. For example, the hashes 311, 312, and 313, generated from the records 301, 302, and 303 of batch 1, may be combined using xor operations or any other suitable commutative operation to generate the combined hash 321, which may be a node of the hash tree 300 and parent to the leaves that include the hashes 311, 312, and 313. The combination hashes 322 and 323 may be similarly be generated from the hashes 314, 315, and 316 of corresponding to batch 2 and the hashes 317, 318, and 319 corresponding to batch 3. The combined hashes 321, 322, and 323 may then be combined to generate the combined hash 331, which may be the root node of the hash tree 300.

Figure 4:
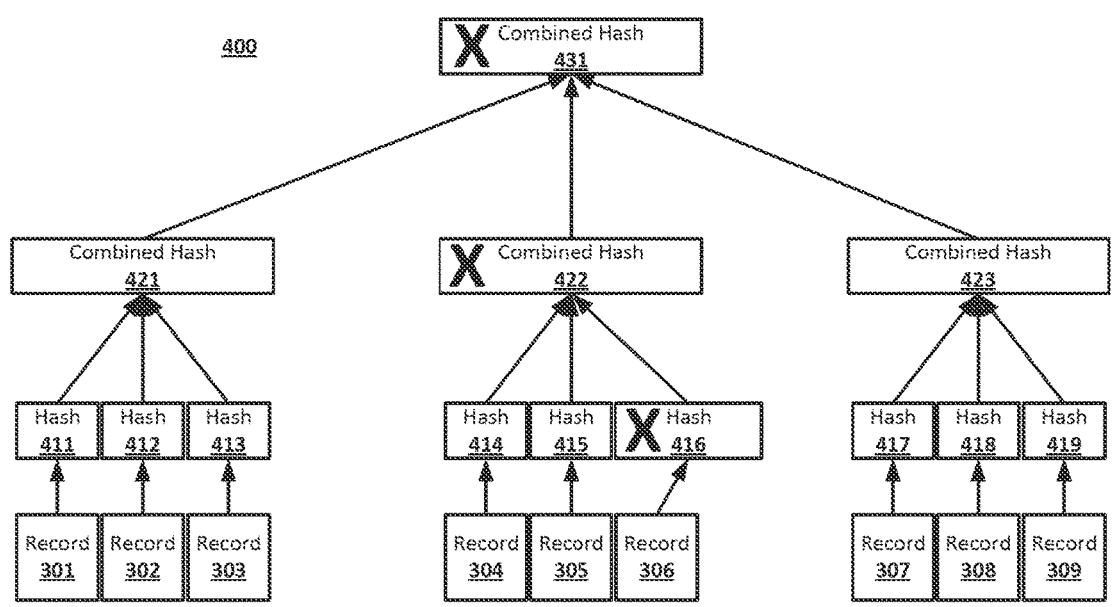
FIG. 4 shows an example arrangement suitable for verification of backup data across a data pipeline according to an implementation of the disclosed subject matter.

FIG. 4 shows an example arrangement suitable for verification of backup data across a data pipeline according to an implementation of the disclosed subject matter. A destination hash tree 400 may be built by the tree builder 224 from hashes 411, 412, 413, 414, 415, 416, 417, 418, and 419 generated by the hasher 222 from the records 301, 302, 303, 304, 405, 306, 307, 308, and 309. The destination hash tree 400 may include, at its second lowest level, combined hashes 421, 422, and 423 generated from, respectively, the hashes 411, 412, and 413, the hashes 414, 415, and 416, and the hashes 417, 418, and 419. The root node of the hash tree 400 may include a combined hash 431 generated by combining the combined hashes 421, 422, and 423. To verify the records 135 stored in the destination storage 130, the verifier 155 may compare the destination hash tree 400 with a source hash tree built from hashes of the records 301, 302, 303, 304, 405, 306, 307, 308, and 309 by the tree builder 213. The verifier 155 may determine, for example, that the combined hash 431 included in the root node of the destination hash tree 400 may not be equal to the combined hash 331 included in the root node of the hash tree 300, which may be the source hash tree. This may indicate that one of the records used to build the destination hash tree 400 was corrupted somewhere in the data pipeline 140 between the first filter 142 and the second filter 144. The verifier may then compare the combined hashes 421, 422, and 423 to the combined hashes 321, 322, and 323, respectively. The verifier 155 may determine that the combined hash 422 is not equal to the combined hash 322. This may indicate that the corrupted record is included in a batch whose hashes are leaves of a sub-tree, or direct child nodes of the node including the combined hash 422. The verifier 422 may then scan through the hashes 414, 415, and 416, comparing them to the hashes 314, 315, and 316 respectively. The verifier 155 may determine that the hash 416 is not equal to the hash 316. This may indicate that the record 306 that was hashed to generate the hash 316 at the first filter 142 and the hash 416 at the second filter 144 was corrupted before arriving at the second filter 144.

Figure 5:
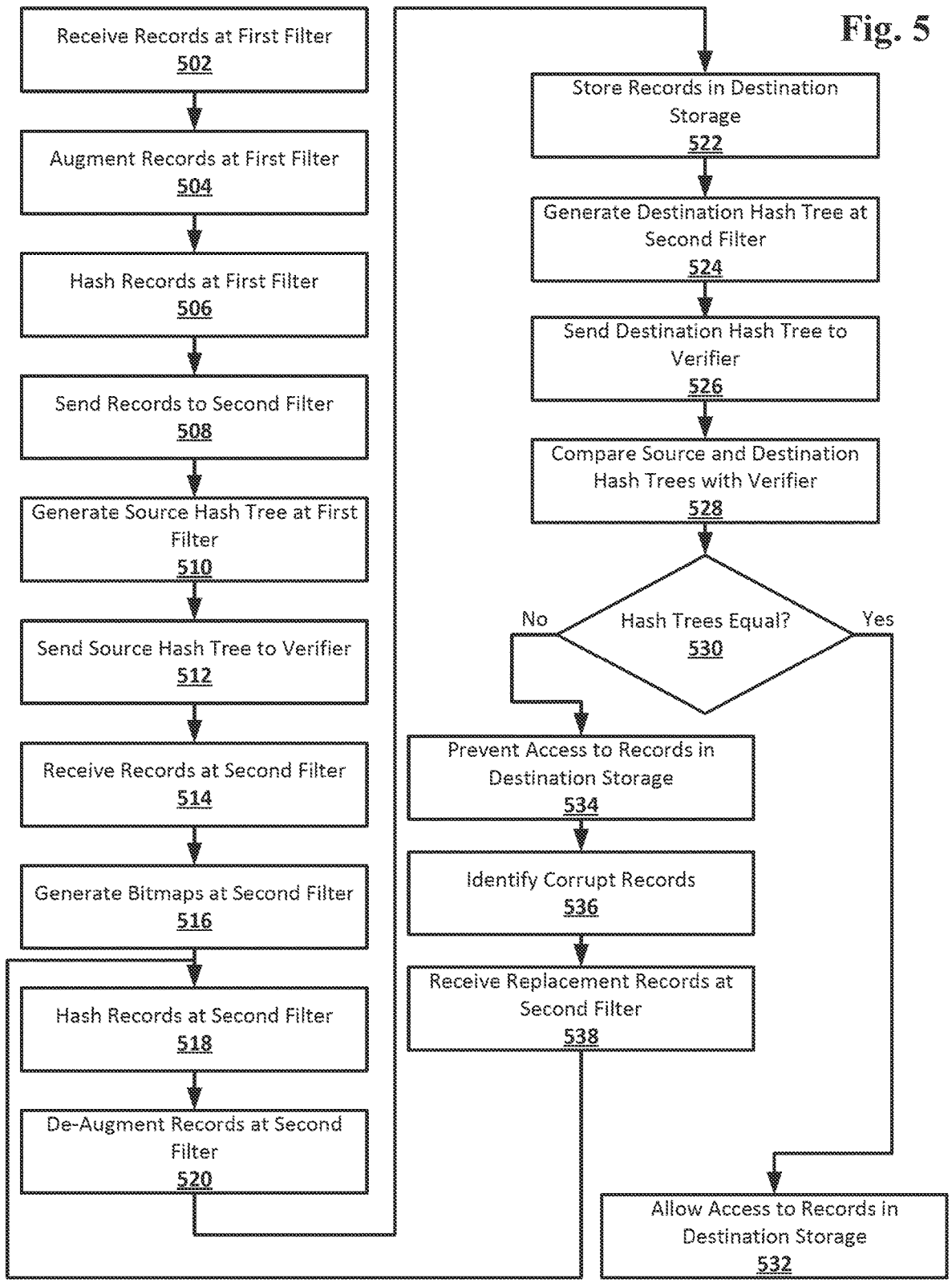
FIG. 5 shows an example procedure suitable for verification of backup data across a data pipeline according to an implementation of the disclosed subject matter.

FIG. 5 shows an example procedure suitable for verification of backup data across a data pipeline according to an implementation of the disclosed subject matter. At 502, records may be received a first filter. For example, records that are copies of the records 115 may be received at the first filter 142 at the first end of the data pipeline 140 from the source storage 110 of the computing device 100. The records that are copies of the records 115 may be received at the first filter 142 as, for example, part of generating a backup of the records 115 on a storage different from the source storage 110. The original records 115 may remain stored in the source storage 110. The records may be received at the first filter 142 continually from the source storage 110, and may be processed through the first filter 142, including the augmenter 211 and the hasher 212, as they are received.

At 504, the records may be augmented at the first filter. For example, the augmenter 211 of the first filter 142 may augment the received records by adding batch identifiers and ordinal identifiers to the records, or by generating an additional record for each batch that includes a batch identifier and a starting and ending object identifier for the batch. The records may be augmented in the order which they are received at the filter 142. For example, with a batch size of 4, the first four records received at the first filter 142 may be assigned a batch identifier of 1 along with ordinal identifiers that are unique to each of the records with the batch identifier of 1.

At 506, the records may be hashed at the first filter. For example, the records, including augmentations added by the augmenter 211, may be hashed by the hasher 212. The hasher 212 may use any suitable hashing algorithm, such as SHA-256, to generate hashes from the records.

At 508, the records may be sent to a second filter. For example, the records, including any augmentations added by the augmenter 211, may be sent to the second filter 144 from the first filter 142 through the data pipeline 140. The records may be sent to the second filter 144 before, after, or during being hashed by the hasher 212, as the first filter 142 may maintain a copy of the records for as long as necessary even after sending the records to the second filter 144. The records may be sent to the second filter continually, with any individual record being sent as soon as it is ready, regardless of whether there are other records that have not yet been received from the source storage 110.

At 510, a source hash tree may be generated at the first filter. For example, the tree builder 213 may use the hashes generated by the hasher 212 to build the source hash tree, for example, the hash tree 300. The tree builder 213 may receive hashes in the same order that the records the hashes were generated from were received at the first filter 142, such that the tree builder 213 may receive the hashes in an order corresponding to the order of the batches of the records. For example, the tree builder 213 may receive hashes of the records assigned the batch identifier 1 first, followed by the hashes of the records assigned the batch identifier 2, and so on. The tree builder 213 may be build the source hash tree by combining the hashes for each batch of records into a combined hash, and then combining combined hashes to build additional levels of the source hash tree until a single combined hash is generated for the root node of source hash tree. At the lowest level, the hash tree may also include the batch identifier and ordinal identifier, or object identifier, associated with the hashes in the leaves, so that record the hash was generated from may be identified.

At 512, the source hash tree may be sent to a verifier. For example, the source hash tree may be sent from the tree builder 213 to the hasher 155 on the computing device 150. The verifier 155 may sit outside of the data pipeline 140, though the computing device 150 may host some elements of the data pipeline 140, for example, with records being transferred through and processed by other processes on the computing device 150. In some implementations, the verifier 155 may receive only the hashes generated by the hasher 211 and may rebuild the source hash tree.

At 514, the records may be received at the second filter. For example. The records sent through the data pipeline 140 may be received at the second filter 144, which may be located at the second end of the data pipeline 140, logically close to the computing device 120. The records may be received at the second filter 142 continually from the first filter 142 and processed through the second filter 142, including the bitmap generator 221, hasher 222, de-augmenter 223, and stored in the destination storage 130, as they are received.

At 516, bitmaps may be generated at the second filter. For example, the bitmap generator 221 may generate bitmaps to track the received records by batch identifier and either ordinal identifier or object identifier. A bitmap may have a number of bits equal to the number of records in a batch, and each bit may correspond to one of the records in the batch either directly by ordinal identifier, for example, with each bit being assigned to correspond to a specific ordinal identifier, or by ordering based on object identifiers, for example, with the first bit corresponding to the lowest object identifier, the last bit corresponding to the highest object identifier, and the bits in-between corresponding to object identifiers increasing from low to high. The bitmap generator 221 may maintain a bitmap for each batch for which any one, but less then all, of the records has been received at the second filter 144. The bitmap generator 221 may check for missing records and duplicate records using the bitmaps and may request missing records be re-sent.

At 518, the records may be hashed at the second filter. For example, the hasher 222 may hash the records received at the second filter 144 to generate hashes. The hasher 222 may hash the records in the same manner, and using the same hashing algorithm, as the hasher 212, such that the hasher 212 and the hasher 222 generate identical hashes from identical records.

At 520, the records may be de-augmented at the second filter. For example, the de-augmenter 223 may remove batch identifiers and ordinal identifiers from records or may filter out additional records added by the augmenter 211, to restore the records to their state before they were augmented by the augmenter 211. The de-augmenter 223 may de-augment the records after or while the hasher 222 hashes the records. For example, the second filter 144 may maintain two copies of each record, such that one copy may be de-augmented while the other is left augmented, hashed, and then discarded.

At 522, the records may be stored in the destination storage. For example, the records, after being de-augmented by the de-augmenter 223, may be stored as the records 135 in the storage 130 on the computing device 120. The records 135 may be a copy of the records 115. Access to the records 135 fin the storage 130 or any non-administrative purposes may be prevented until the records received at the second filter 144 have been verified by the verifier 155. This may prevent the records 135 from being used to, for example, by restore records of the records 115 that are missing or corrupt, or being used for other database purposes, until it has been verified that none of the records 135 are corrupt.

At 524, a destination hash tree may be generated at the second filter. For example, the tree builder 224 may use the hashes generated by the hasher 222, along with the batch identifiers and ordinal identifiers, or additional records and object identifiers, to build the destination source tree 400. Because the records may be received at the second filter 144 in a different order than they were received at the first filter 142, the tree builder 224 may receive hashes of the records in a different order than the hashes were received by the tree builder 213. The tree builder 224 may use the batch identifiers, or the additional records and object identifiers, of records to properly group the hashes generated from the records into batches and to properly order the batches. This may allow the tree builder 224 to replicate the order in which the records were received at the first filter 142 and the hashes were received at the tree builder 213. The tree builder 224 may then build the destination hash tree 400 in the same manner, and with the same ordering of hashes at a batch level, as the tree builder 213 built the source hash tree. If the combined hashes are generated with a commutative operation such as xor, the hashes within a batch may not need to be in the same order, though they may need to be in the same order if the operation used is non-commutative. At the lowest level, the hash tree may also include the batch identifier and ordinal identifier, or object identifier, associated with the hashes in the leaves, so that record the hash was generated from may be identified.

At 526, the destination hash tree may be sent to the verifier. For example, the tree builder 224 may send the destination hash tree 400 to the verifier 155.

At 528, the source and destination hash trees may be compared with the verifier. For example, the verifier 155 may perform a root-down comparison between the source hash tree and the destination hash tree 400. The verifier 155 may start by comparing the combined hashes included in the roots of the source and destination hash tree to determine if they are equal. If they are equal, the source and destination hash trees may be considered to be equal, although the comparison may continue for all of the corresponding nodes across both the source and destination hash trees to ensure their equality. If the combined hashes in the root nodes are not equal, the source and destination hash trees are not equal, indicating that a record was corrupted in the data pipeline 140 after being sent from the first filter 142.

At 530, if the source and destination hash trees are equal, flow may proceed to 532. Otherwise flow may proceed to 534.

At 532, access may be allowed to the records in the destination storage. For example, the verifier 155 may have determined that the source hash tree and the destination hash tree were equal, including the same combined hash in their root node. None of the records received at the second filter 144 and stored as the records 135 may have been corrupted in the data pipeline 140. The records 135 may be non-corrupt duplicates of the records 115. The verifier 155 may indicate to the computing device 120 that access should be allowed to the records 135 for any suitable purposes, including, for example, use as backups to restore missing or corrupted records from the record 115, or as a sandbox or production database.

At 534, access to the records in the destination storage may be prevented. For example, if the verifier 155 may have determined that the source hash tree and destination hash tree were not equal, including different combined hashes in their root nodes. Some of the records received at the second filter 144 may have been corrupted in the data pipeline 140, and the records 135 may include these corrupt records. The verifier 155 may indicate to the computing device 120 that access to the records 135 should continue to be prevented except for administrative purposes such as deleting, modifying, or examining any of the records 135. The computing device 120 may continue to prevent the records 135 from being used to restore missing or corrupt records of the records 115 or as a sandbox or production database.

At 536, corrupt records may be identified. For example, the verifier 155 may continue the root down comparison of the source hash tree and the destination hash tree until the verifier 155 reaches the leaves. The verifier 155 may perform the comparison one level at a time and may only compare nodes from the destination hash tree that are child nodes of nodes whose combined hashes were already determined to not be equal to the combined hashes in their corresponding nodes in the source hash tree. For example, because the verifier 155 may have already determined that the combined hash in the root node of the destination hash tree is not equal to the combined hash in the root node of the source hash tree, the comparison may continue on the level below the root node. The verifier 155 may compare the combined hashes in all of the children of the root node of the destination hash tree to the combined hashes in the corresponding nodes in the source hash tree. This may be repeated for all nodes in the destination hash tree whose combined hash is determined to not be equal to the combined hash in the corresponding node in the source hash tree. Once the verifier 155 reaches the leaves, the hashes in the leaves of the destination hash tree that have a parent node whose combined hash was not equal to its corresponding nodes combined hash in the source hash tree may be compared to the corresponding hashes in the source hash tree. Any non-equal hashes may indicate that the record that the hash was generated from was corrupted before being received at the second filter 144. Once the corrupted records have been identified through the hash tree comparison, the verifier 155 may send the identity of the corrupted records, for example, batch identifier and ordinal identifier or object identifier, to any suitable destination, including, for example, the computing device 100 or the first filter 142, to request that the records be re-sent to the second filter 144.

At 538, replacement records may be received at the second filter. For example, after receiving the request to resend records from the verifier 155, the computing device 100 or the first filter 142 may initiate the resending of the requested records to replace the corrupted records. The replacement records may be sent to the second filter 144 across the date pipeline 140 after being augmented, if necessary, by the augmenter 211. Flow may then proceed to 518, where the replacement records may be hashed to generate a new hash which may then be used to rebuild the destination hash tree and de-augmented and stored with the records 135 replacing the corrupted records. The verifier 155 may then re-run its comparison of the source hash tree and rebuilt destination hash tree to determine if the replacement records were not themselves corrupted. This may be repeated until the verifier 155 determines that all of the corrupt records have been replaced with non-corrupt records, indicated by the source hash tree and the destination hash tree being equal.

Implementations of the presently disclosed subject matter may be implemented in and used with a variety of component and network architectures. FIG. 6 is an example computer 20 suitable for implementing implementations of the presently disclosed subject matter. As discussed in further detail herein, the computer 20 may be a single computer in a network of multiple computers. As shown in FIG. 6, computer 20 may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
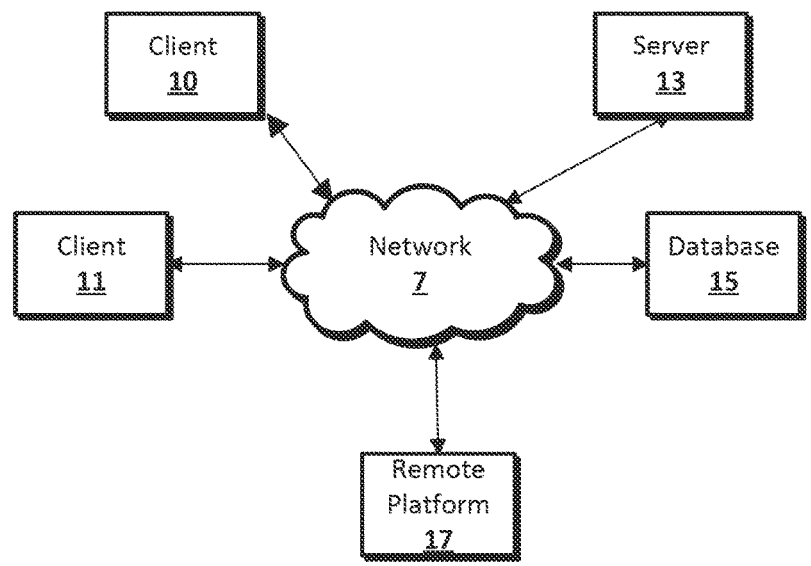
FIG. 7 shows a network configuration according to an implementation of the disclosed subject matter.

FIG. 7 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving at a first end of a data pipeline, from a first storage, records;
   hashing the records to generate first hashes;
   generating a first hash tree from the first hashes;
   receiving, at a second end of the data pipeline, the records;
   generating bitmaps for unique batches of the records;
   setting bits of the bitmaps that correspond to the records received at the second end of the data pipeline as the records are received at the second end of the data pipeline;

hashing the records as the records are received at the second end of the data pipeline to generate second hashes;
storing the records in a second storage as the records are received at the second end of the data pipeline;
generating a second hash tree from the second hashes;
determining, using the bitmaps, if all of the records were received at the second end of the data pipeline and if any duplicates of any of the records were received at the second end of the data pipeline; and
comparing the first hash tree and the second hash tree to determine if any of the records stored in the second storage are corrupt.

2. The computer-implemented method of claim 1, further comprising preventing access to the records in the second storage until the comparison of the first hash tree and the second hash tree determines that none of the records in the second storage are corrupt.

3. The computer-implemented method of claim 1, further comprising sending a record to the second end of the data pipeline when it is determined using the bitmaps that the record was not received at the second of the data pipeline.

4. The computer-implemented method of claim 1, further comprising assigning the records batch identifiers and ordinal identifiers after the records are received at the first end of the data pipeline and before the records are received at the second end of the data pipeline.

5. The computer-implemented method of claim 4, further comprising removing the batch identifiers and the ordinal identifiers from the records before storing the records in the second storage.

6. The computer-implemented method of claim 1, wherein generating the second hash tree further comprises using the batch identifiers and the ordinal identifiers from the records.

7. The computer-implemented method of claim 1, wherein the records further comprise object identifiers, and further comprising generating additional records for the unique batches of the records, the additional records comprising batch identifiers, starting object identifiers, and ending object identifiers.

8. A computer-implemented system comprising:
a first storage and a second storage; and
one or more processors that receive at a first end of a data pipeline, from the first storage, records,
hash the records to generate first hashes,
generate a first hash tree from the first hashes,
receive, at a second end of the data pipeline, the records;
generate bitmaps for unique batches of the records;
set bits of the bitmaps that correspond to the records received at the second end of the data pipeline as the records are received at the second end of the data pipeline,
hash the records as the records are received at the second end of the data pipeline to generate second hashes;
store the records in the second storage as the records are received at the second end of the data pipeline;
generate a second hash tree from the second hashes,
determine, using the bitmaps, if all of the records were received at the second end of the data pipeline and if any duplicates of any of the records were received at the second end of the data pipeline, and
compare the first hash tree and the second hash tree to determine if any of the records stored in the second storage are corrupt.

9. The computer-implemented system of claim 8, wherein the one or more processors further prevent access to the records in the second storage until the comparison of the first hash tree and the second hash tree determines that none of the records in the second storage are corrupt.

10. The computer-implemented system of claim 8, wherein the one or more processors further send a record to the second end of the data pipeline when it is determined using the bitmaps that the record was not received at the second of the data pipeline.

11. The computer-implemented system of claim 8, wherein the one or more processors assign the records batch identifiers and ordinal identifiers after the records received at the first end of the data pipeline and before the records are received at the second end of the data pipeline.

12. The computer-implemented system of claim 8, wherein the one or more processors further remove the batch identifiers and the ordinal identifiers from the records before storing the records in the second storage.

13. The computer-implemented system of claim 8, wherein the one or more processors generate the second hash tree by using the batch identifiers and the ordinal identifiers from the records.

14. The computer-implemented system of claim 8, wherein the records further comprise object identifiers, and wherein the one or more processors further generate additional records for the unique batches of the records, the additional records comprising batch identifiers, starting object identifiers, and ending object identifiers.

15. A system comprising: one or more computers and one or more non-transitory storage devices storing instructions which are operable, when executed by the one or more computers, to cause the one or more computers to perform operations comprising:
receiving at a first end of a data pipeline, from a first storage, records;
hashing the records to generate first hashes;
generating a first hash tree from the first hashes;
receiving, at a second end of the data pipeline, the records;
generating bitmaps for unique batches of the records;
setting bits of the bitmaps that correspond to the records received at the second end of the data pipeline as the records are received at the second end of the data pipeline;
hashing the records as the records are received at the second end of the data pipeline to generate second hashes;
storing the records in a second storage as the records are received at the second end of the data pipeline;
generating a second hash tree from the second hashes;
determining, using the bitmaps, if all of the records were received at the second end of the data pipeline and if any duplicates of any of the records were received at the second end of the data pipeline; and
comparing the first hash tree and the second hash tree to determine if any of the records stored in the second storage are corrupt.

16. The system of claim 15, wherein the one or more computers and one or more non-transitory storage devices further store instructions which are operable, when executed by the one or more computers, to cause the one or more computers to further perform operations comprising:
preventing access to the records in the second storage until the comparison of the first hash tree and the second hash tree determines that none of the records in the second storage are corrupt.

17. The system of claim 15, wherein the one or more computers and one or more non-transitory storage devices further store instructions which are operable, when executed by the one or more computers, to cause the one or more computers to further perform operations comprising:

sending a record to the second end of the data pipeline when it is determined using the bitmaps that the record was not received at the second of the data pipeline.

18. The system of claim 15, wherein the one or more computers and one or more non-transitory storage devices further store instructions which are operable, when executed by the one or more computers, to cause the one or more computers to further perform operations comprising:

assigning the records batch identifiers and ordinal identifiers after the records are received at the first end of the data pipeline and before the records are received at the second end of the data pipeline.

19. The system of claim 18, wherein the one or more computers and one or more non-transitory storage devices further store instructions which are operable, when executed by the one or more computers, to cause the one or more computers to further perform operations comprising:

removing the batch identifiers and the ordinal identifiers from the records before storing the records in the second storage.

20. The system of claim 15, wherein the one or more computers and one or more non-transitory storage devices further store instructions which are operable, when executed by the one or more computers, to cause the one or more computers to perform the operation of generating the second hash tree by performing operations further comprising:

using the batch identifiers and the ordinal identifiers from the records.

\* \* \* \* \*